United States Patent [19]

Huang et al.

[11] Patent Number: 5,597,978
[45] Date of Patent: Jan. 28, 1997

[54] HIGH ENERGY HYDROXY-TERMINATED POLYAZIDO POLYMERS

[75] Inventors: Der-Shing Huang, Carmichael; Renato R. Rindone, Fair Oaks, both of Calif.

[73] Assignee: Aerojet-General Corporation, Rancho Cordova, Calif.

[21] Appl. No.: 98,529

[22] Filed: Sep. 18, 1987

Related U.S. Application Data

[63] Continuation-in-part of Ser. No. 686,953, Dec. 27, 1984, abandoned.

[51] Int. Cl.[6] .................................................. C06B 45/10
[52] U.S. Cl. ........................................ 149/19.6; 525/420
[58] Field of Search ................................ 149/19.1, 19.6

[56] References Cited

U.S. PATENT DOCUMENTS

| | | | |
|---|---|---|---|
| 3,065,188 | 11/1962 | Vandenberg | 260/2 |
| 3,694,383 | 9/1972 | Azami et al. | 260/2 X A |
| 4,009,128 | 2/1977 | Vandenberg | 260/2 A |
| 4,268,450 | 5/1981 | Frankel et al. | 260/349 |
| 4,288,262 | 9/1981 | Flanagan et al. | 149/19.6 |
| 4,303,414 | 12/1981 | Frankel et al. | 44/63 |
| 4,379,894 | 4/1983 | Frankel et al. | 525/403 |
| 4,405,762 | 9/1983 | Earl et al. | 525/410 |
| 4,483,978 | 11/1984 | Manser | 528/408 |

OTHER PUBLICATIONS

E. J. Vandenberg, "Synthesis, Mechanism, and Property Aspects of a New Class of Polyethers: Poly(1,4-dichloro-2,3-epoxybutane)s", *Journal of Polymer Science*, vol. 13, 2221-2222 (1975).

E. J. Vandenberg, "A New Class of Polyethers—Poly(1,4-dichloro-2,3-epoxybutane)s,—Synthesis, Mechanism and Property Aspects", *Pure & Applied Chem.*, vol. 48, 295-306 (1976).

Carlo Venturello et al., "A New Effective Catalytic System for Epoxidation of Olefins by Hydrogen Peroxide under Phase-Transfer Conditions", *J. Org. Chem.*, vol. 48, 3831-3833 (1983).

*Primary Examiner*—Charles T. Jordan
*Assistant Examiner*—John R. Hardee
*Attorney, Agent, or Firm*—Townsend and Townsend and Crew LLP

[57] ABSTRACT

Hydroxy-terminated aliphatic polyethers having the formula

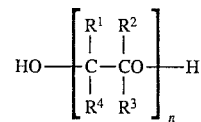

in which $R^1$, $R^2$, $R^3$ and $R^4$ are independently selected from the group consisting of H, $CH_2N_3$ and $CHN_3CH_2N_3$, such that the total number of azide groups per monomer unit is two to four, and n is an integer from 2 to 40, display unique properties as energetic polymers. Co-polymers of the monomer units in the above formula with other, known azido-substituted monomer units further provide energy outputs at preselected levels based on the proportions of each type of monomer present.

41 Claims, No Drawings

HIGH ENERGY HYDROXY-TERMINATED POLYAZIDO POLYMERS

CROSS-REFERENCE TO RELATED APPLICATION

This application is a continuation-in-part of application Ser. No. 06/686,953, filed Dec. 27, 1984, now abandoned.

BACKGROUND OF THE INVENTION

This invention relates to hydroxy-terminated aliphatic polyethers having pendant alkyl azide groups, and their use in propellants and explosives.

Solid double-base propellants such as those used for rocket fuel are fabricated by combining an explosive (or "energetic") liquid binder with a fuel (commonly nitrocellulose). One class of such binders are azido compounds, which are particularly advantageous because of their relatively cool burning temperature, which leads to less corrosion and a longer life for the materials used to contain the explosives. Examples of such compounds are alkyl diazidopolyepoxides having one or two azide groups and four or more carbon atoms per monomer unit, as disclosed in Frankel, et al., U.S. Pat. No. 4,268,450 (May 19, 1981); and the poly(gembisazidomethyloxetanes) of Earl, et al., U.S. Pat. No. 4,405,762 (Sep. 20, 1983). Other disclosures of these and similar compounds appear in Azami, et al., U.S. Pat. No. 3,694,383 (Sep. 26, 1972) and Frankel, et al., U.S. Pat. No. 4,303,414 (Dec. 1, 1981).

Unfortunately, those azido polyethers which are known generally require starting materials which are either expensive or difficult to synthesize, and some are solid, rendering them inconvenient to use in the manufacture of explosives.

SUMMARY OF THE INVENTION

A novel class of azide-substituted polyethers with unique properties has now been discovered, many of which are capable of being prepared from readily available starting materials. These novel substances are capable of increased energy output per unit weight with no loss of stability for purposes of handling, transportation or storage. In fact, many of these substances have lower sensitivity to impact than known substances of related molecular structures which have a lower heat of explosion. This is particularly surprising in view of the expectation that sensitivity to impact would rise as energy output rises.

The differences in expected energy outputs may be seen by comparing the formulas of the repeating units of examples of the novel polyethers of the present invention with four prominent known analogs.

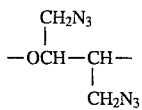

poly(1,4-diazido-2,3-epoxybutane)
(or disubstituted azido polymer, "DAP")

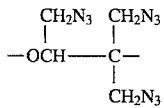

poly(1,4-diazido-3-azidomethyl-2,3-epoxybutane)
(or trisubstituted azidopolymer, ("TRAP")

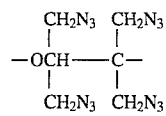

poly(1,4-diazido-2,3-diazidomethyl-2,3-epoxybutane
(or tetrasubstituted azidopolymer, "TAP")

The known analogs are as follows (represented by their repeating units):

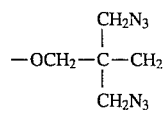

poly(3,3-bisazidomethyloxetane) ("BAMO")

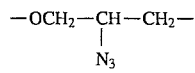

poly(2-azidooxetane) ("AZOX")

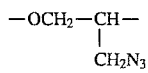

glycidyl azide polymer ("GAP")

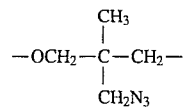

poly(3-azidomethyl-3-methyloxetane) ("AMMO")

From the formulas shown, the heats of explosion may be calculated as follows:

| Polymer | Heat of Explosion (kcal per 100 g) |
|---|---|
| DAP | −98.1 |
| TRAP | −114.5 |
| TAP | −124.2 |
| BAMO | −84.5 |
| AZOX | −66.4 |
| GAP | −63.3 |
| AMMO | −34.8 |

As will be shown below, the novel polyethers of the present invention, despite their higher heats of explosion, are less sensitive to impact than their known analogs.

In addition, the compounds are liquid at ambient temperatures, greatly facilitating their use.

It has further been discovered that combining different azido-substituted epoxide monomers into copolymers results in a product which is more thermally stable than homopolymers of either of the constituent monomers. Such combinations are particularly useful when a high energy monomer and a low energy monomer are used, since one can prepare a copolymer of a preselected energy value by combining the monomers in the appropriate proportions.

DETAILED DESCRIPTION OF THE INVENTION

In accordance with the present invention, there is provided a hydroxy-terminated aliphatic polyether having the formula:

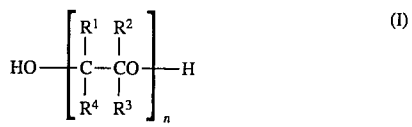

in which $R^1$, $R^2$, $R^3$ and $R^4$ are independently selected from the group consisting of H, $CH_2N_3$ and $CHN_3CH_2N_3$ (hereinafter referred to as "$C_2H_3N_6$"), such that the total number of azide ($N_3$) groups per monomer unit is two, three or four; and n is an integer ranging from 2 to 40. The term "independently selected" is used herein to indicate that two or more of the R groups may be identical or all may be different.

Contemplated equivalents of the compounds of formula I are compounds otherwise corresponding thereto and having the same general properties, wherein for example one or more of the substituents may be the azide group itself, or the total number of azide groups is five or six.

Within the scope of the above formula, certain embodiments are preferred, namely those in which $R^1$, $R^2$, $R^3$ and $R^4$ are independently selected from the group consisting of H and $CH_2N_3$, and those in which n is from 3 to 30.

Examples of polyethers within Formula I are those in which $R^1$, $R^2$ and $R^3$ are as follows:

| $R^1$ | $R^2$ | $R^3$ | $R^4$ |
|---|---|---|---|
| $CH_2N_3$ | H | $CH_2N_3$ | H |
| $CH_2N_3$ | $CH_2N_3$ | $CH_2N_3$ | H |
| $CH_2N_3$ | $CH_2N_3$ | $CH_2N_3$ | $CH_2N_3$ |
| H | $CH_2N_3$ | $CH_2N_3$ | H |
| H | H | $C_2H_3N_6$ | H |

The polymer may be a homopolymer or copolymer, with two or more different monomer units within the scope of Formula I, in any proportion, order or arrangement.

Examples of copolymers combining different monomer units within Formula I are those of the formula

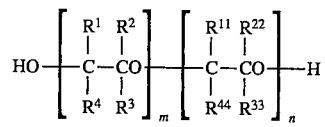

where:

| $R^1$ | $R^2$ | $R^3$ | $R^4$ | $R^{11}$ | $R^{22}$ | $R^{33}$ | $R^{44}$ |
|---|---|---|---|---|---|---|---|
| $CH_2N_3$ | H | $CH_2N_3$ | H | H | H | $C_2H_3N_6$ | H |
| $CH_2N_3$ | H | $CH_2N_3$ | H | H | $CH_2N_3$ | $CH_2N_3$ | H |
| $CH_2N_3$ | $CH_2N_3$ | $CH_2N_3$ | H | H | $CH_2N_3$ | $CH_2N_3$ | H |
| $CH_2N_3$ | $CH_2N_3$ | $CH_2N_3$ | $CH_2N_3$ | H | $CH_2N_3$ | $CH_2N_3$ | H |
| H | H | $C_2H_3H_6$ | H | H | $CH_2N_3$ | $CH_2N_3$ | H |
| $CH_2N_3$ | H | $CH_2N_3$ | H | $CH_2N_3$ | $CH_2N_3$ | $CH_2N_3$ | $CH_2N_3$ |
| $CH_2N_3$ | H | $CH_2N_3$ | H | $CH_2N_3$ | $CH_2N_3$ | $CH_2N_3$ | H |
| $CH_2N_3$ | $CH_2N_3$ | $CH_2N_3$ | H | $CH_2N_3$ | $CH_2N_3$ | $CH_2N_3$ | $CH_2N_3$ |
| $CH_2N_3$ | $CH_2N_3$ | $CH_2N_3$ | H | H | H | $C_2H_3N_6$ | H |
| $CH_2N_3$ | $CH_2N_3$ | $CH_2N_3$ | $CH_2N_3$ | H | H | $C_2H_3N_6$ | H |

The invention further resides in copolymers in which different monomer units in general are combined for improved thermal stability, the monomer units varying in either the number of carbon atoms, the number of azido groups, the arrangement of the atoms or groups along the chain, or combinations of these features. Such copolymers may also be used to vary the energy output capability per unit weight of the polymer, or to modify the properties to accommodate or ameliorate the product use. Examples of monomer units for such copolymers include those shown in Formula I above as well as those having the formula

in which $R^5$ is selected from the group consisting of $CH_2CHN_3CH_2N_3$ and $(CH_2)_rN_3$, where r is an integer from 1 to 5; and those having the formula

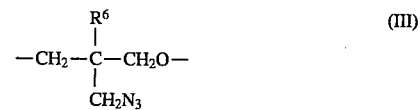

in which $R^6$ is selected from the group consisting of H, $CH_3$ and $CH_2N_3$. Again, the total number of monomer units per polymer chain generally ranges from 2 to 40. Preferred copolymers will contain at least one unit of the monomer indicated in Formula I above, and at least one of either or both of the monomer units of Formulas II and III. For copolymers of the monomers of Formulas I and II, preferred species are those in which the monomer ratio (Formula I to II) is from about 0.6 to about 1.5, more preferably from about 0.8 to about 1.2, and most preferably about 1.0.

Examples of copolymers combining monomer units of Formulas I and II are those in which:

| $R^1$ | $R^2$ | $R^3$ | $R^4$ | $R^5$ |
|---|---|---|---|---|
| $CH_2N_3$ | H | $CH_2N_3$ | H | $CH_2N_3$ |
| H | $CH_2N_3$ | $CH_2N_3$ | H | $CH_2N_3$ |
| $CH_2N_3$ | $CH_2N_3$ | $CH_2N_3$ | H | $CH_2N_3$ |
| $CH_2N_3$ | $CH_2N_3$ | $CH_2N_3$ | $CH_2N_3$ | $CH_2N_3$ |
| H | H | $C_2H_3N_6$ | H | $CH_2N_3$ |

Examples of copolymers combining monomer units of Formulas I and III are those in which:

| $R^1$ | $R^2$ | $R^3$ | $R^4$ | $R^6$ |
|---|---|---|---|---|
| $CH_2N_3$ | H | $CH_2N_3$ | H | H |
| $CH_2N_3$ | H | $CH_2N_3$ | H | $CH_3$ |
| $CH_2N_3$ | H | $CH_2N_3$ | H | $CH_2N_3$ |
| $CH_2N_3$ | $CH_2N_3$ | $CH_2N_3$ | H | H |
| $CH_2N_3$ | $CH_2N_3$ | $CH_2N_3$ | H | $CH_3$ |
| $CH_2N_3$ | $CH_2N_3$ | $CH_2N_3$ | H | $CH_2N_3$ |
| $CH_2N_3$ | $CH_2N_3$ | $CH_2N_3$ | $CH_2N_3$ | H |

| CH₂N₃ | CH₂N₃ | CH₂N₃ | CH₂N₃ | CH₃ |
|---|---|---|---|---|
| CH₂N₃ | CH₂N₃ | CH₂N₃ | CH₂N₃ | CH₂N₃ |
| H | H | C₂H₃N₆ | H | H |
| H | H | C₂H₃N₆ | H | CH₃ |
| H | H | C₂H₃N₆ | H | CH₂N₃ |
| H | CH₂N₃ | CH₂N₃ | H | H |
| H | CH₂N₃ | CH₂N₃ | H | CH₃ |
| H | CH₂N₃ | CH₂N₃ | H | CH₂N₃ |

Examples of copolymers combining monomer units of Formulas II and III are those in which:

| $R^5$ | $R^6$ |
|---|---|
| CH₂N₃ | CH₃ |
| CH₂N₃ | CH₂N₃ |
| CH₂N₃ | H |

Polymeric chains according to the present invention which terminate at both ends with primary alcohol groups have a particular advantage, since such groups are more reactive toward isocyanate groups during curing than the corresponding secondary and tertiary hydroxyl end groups. Such species are therefore preferable in their use as binders and plasticizers. Proper selection of monomers and control of the reaction conditions may be made to achieve such structures in high concentrations. For example, a polymer of any combination of monomers may be further polymerized with a suitable starting material to result in a monomer in accordance with Formula III above to cap each end of the chain.

The polymers of the present invention may be prepared in accordance with conventional procedures. For monomers within the scope of those shown in Formula I above, the starting materials may be halogenated, preferably chlorinated, alkenes, which may be converted to the corresponding epoxides by catalytic oxidation according to known procedures. The halogenated epoxide may then be converted to the azide prior to polymerization, or alternatively, polymerized first and then converted to the azide. The latter route is preferred. Polymerization is conveniently achieved using a strong acid or Lewis acid catalyst such as, for example, boron trifluoride, boron trifluoride etherate, stannic acid, fluoroboric acid and organoaluminum compounds, and in the case of highly substituted epoxides such as the tetrasubstituted species, magic acid (a 1:1 mixture of $HSO_3F$ and $SbF_5$). Conversion to the azide may be achieved by reaction of the halogenated compound with a metal azide, such as sodium azide, in aprotic solvents such as, for example, dimethylformamide and dimethyl sulfoxide, or in aqueous media with a phase transfer catalyst such as a quaternary ammonium salt.

In the case of polymers incorporating monomer units within Formula III above, an appropriately substituted oxetane may be used as the starting material.

The polymers and copolymers disclosed herein are useful as binders for explosives, gas generators and propellants. Of particular interest is their use in case curable explosives and propellants.

The following examples are offered for illustrative purposes, and are intended neither to limit nor define the invention in any manner.

EXAMPLE 1

This example illustrates the preparation and properties of the homopolymer poly(1,4-diazido-2,3-epoxybutane), conveniently referred to herein as "DAP" (for diazido polymer).

A. Preparation of Poly(1,4-Dichloro-2,3-epoxybutane)
A reaction flask was charged with the following:

| Ethylene glycol | 0.52 g |
|---|---|
| Methylene chloride | 15 ml |
| Fluoroboric acid (48–50%) | 0.13 g |

The mixture was placed under a positive nitrogen atmosphere, and 42.3 g of 1,4-dichloro-2,3-epoxybutane (a mixture of cis- and trans-isomers prepared according to literature procedures) dissolved in 15 ml of methylene chloride was added in dropwise manner while the reaction mixture was maintained under mild reflux (41° C.). As reflux continued, minor amounts of fluoroboric acid and boron trifluoride etherate were added dropwise and the methylene chloride was distilled off. The reaction mixture was then chilled to 25° C. and 0.8 g of anhydrous stannic chloride was added. An exotherm to 38° C. was observed and the reaction mixture was heated to 75°–78° C., whereupon a total of 0.32 g of additional stannic chloride was added in portions over an eight-hour period, at the end of which time no 1,4-dichloro-2,3-epoxybutane was detectable by gas chromatographic. The reaction mixture was then chilled to 25° C. and quenched with a mixture of methanol (34.2 g), water (28.4 g) and 29.6% ammonium hydroxide (12.0 g).

Phase separation was facilitated by the addition of 350 ml of ethylene dichloride and the aqueous layer was discarded. The organic layer was washed with two portions of water (150 ml each) and concentrated in vacuo (50°–60° C., 0.17–0.4 mm Hg) to 42.1 g on a brown viscous oil. This was dissolved in 80 ml methylene chloride and purified by a silica gel column, then concentrated again in vacuo to 33.9 g of a yellow viscous oil (79.2% yield), confirmed as poly(1,4-dichloro-2,3-epoxybutane) by infrared spectroscopy. Gel permeation chromatography established the weight average molecular weight (Mw) as 768 and the number average molecular weight (Mn) as 539. The equivalent weight was determined to be 1094.

B. Conversion to Diazido Polymer

A reaction flask was charged with 21 g of dimethyl sulfoxide and placed under a positive nitrogen atmosphere. The flask was heated to bring the dimethyl-sulfoxide temperature to 77° C. and 5.6 g of sodium azide was added. The mixture was then heated to 93° C. and 5.1 g of the polymer prepared in the preceding section, dissolved in 10.7 g of dimethyl sulfoxide, was added dropwise while the temperature was maintained at 95°–100° C. (the addition was extended over a period of approximately forty-five minutes). The temperature was maintained for an additional eight hours, after which time the reaction mixture was chilled and quenched with 300 ml of water.

The aqueous layer was discarded, leaving a brown organic layer. The latter was dissolved in 80 ml methylene chloride and washed eight times with 100 ml portions of water. The organic phase was then dried with 12 g of sodium sulfate, purified by a silica gel column, and concentrated in vacuo (40° C., 0.75–12.0 mm Hg) to a viscous yellow oil weighing 3.8 g (68.2% yield). Infrared film spectroscopy established the structure as that of the diazido polyether, poly(1,4-diazido-2,3-epoxyethane) reading 3500 cm⁻¹ (—OH), 2100 cm⁻¹ (—N₃), 1100 cm⁻¹ (C—O—C). Gel permeation chromatography established Mw=875 and Mn=798.

C. Hazard Characteristics

The product of Section B above was subjected to a series of standard tests as follows. In an impact test measuring the sensitivity of the sample to shock, a small quantity of the sample was placed on an anvil, and a 2-kg weight in the shape of an inverted cone was dropped onto the sample from successive heights. The lowest height which resulted in explosion of the sample was recorded. In a test measuring the sensitivity of the sample to rotary friction, the same was placed under a known weight rotating at 2000 revolutions per minute, and the pressure or absence of explosion recorded. In a spark tests sparks of predetermined energy were passed through the sample, and the presence or absence of explosion recorded. Finally, a differential thermal analysis (DTA) was performed by heating the sample at a preset standard rate and recording the temperature at which an exotherm is first observed as well as the peak temperature of the exotherm.

The results of these tests on the product of Section B above were as follows:

| Impact (Bureau of Mines, 2 kg weight) | 41 cm (noise) |
|---|---|
| Rotary friction | >4000 g at 2000 rpm |
| Spark | >0.025 joule |
| DTA exotherm - onset: | 139.4° C. |
| peak: | 216.7° C. |

EXAMPLE 2

This example illustrates an alternate method for preparing the prepolymer poly(1,4-dichloro-2,3-epoxybutane), achieving a higher molecular weight.

A reaction flask was charged with the following:

| Ethylene glycol | 1.72 g |
|---|---|
| Anhydrous stannic chloride | 0.56 g |
| 1,2-Dichloroethane | 50 ml |

The mixture was placed under a positive nitrogen atmosphere and stirred until clear. The mixture was then heated to 60° C. and a solution of 138.9 g of 1,4-dichloro-2,3-epoxybutane (prepared as in Example 1, Section A) in 50 ml of 1,2-dichloroethane was added dropwise over a period of one hour. With the reaction mixture maintained at 80°–95° C., an additional 13.02 g of anhydrous stannic chloride was added in ten portions over a period of 51 hours until no 1,4-dichloro-2,3-epoxybutane could be detected by gas chromatography.

The reaction mixture was then chilled to 25° C. and quenched with 300 ml of water. Phase separation was facilitated by the addition of 1500 ml of 1,2-dichloroethane, and the aqueous layer was discarded. The organic layer was then washed with water in six portions of 500 ml each, concentrated in vacuo (47° C., 0.3 mm Hg) to give 132.3 g of a dark brown viscous oil. The oil was dissolved in 494 g of methylene chloride and purified by a silica gel column and a silica gel/alumina column, then concentrated in vacuo again to give 105.8 g of a brown viscous oil (75.2% yield). The product was again dissolved in 35.3 g of methylene chloride, washed with eight portions, 50 g each, of a methanol/water mixture (207.5/29.2 weight ratio), and again concentrated in vacuo to give 64.2 g of a brown viscous resin-like material (45.7% yield). Infrared spectroscopy (potassium bromide diffusive refractance) gave 3500 cm$^{-1}$ (—OH), 1100 cm$^{-1}$ (C—O—C), 750 cm$^{-1}$ (C—Cl), confirming the structure as that of the title polymer, and gel permeation chromatography gave Mw=1142 and Mn=886. Equivalent weight was determined to be 1645.

EXAMPLE 3

This example illustrates a further alternative method for preparing the prepolymer of Examples 1 and 2, yielding a still higher molecular weight and converting to the diazido polymer.

A. Preparation of Poly(1,4-dichloro-2,3-epoxybutane)

A reaction flask was charged with 54 g of triisobutyl aluminum as a 25% solution in toluene, and chilled to 3° C. Hexafluoroacetone trihydrate 3.48 g was then added dropwise through a serum cap over a period of 65 minutes while the temperature of the mixture was maintained in the range of 3°–10° C. A clear solution resulted, which was warmed to ambient temperature (22.5° C.) and stirred overnight. The resulting catalyst mixture weighed 55.6 g.

A second reaction flask, maintained under a positive nitrogen atmosphere, was charged with 70.5 g of 1,4-dichloro-2,3-epoxybutane and 100 ml of methylene chloride (dried over anhydrous sodium sulfate), and 18.54 g of the above catalyst mixture was added in six portions over thirty-two hours at 21°–23° C. The reaction mixture was then quenched with ethyl alcohol and water, and the aqueous layer discarded. The organic layer was then washed with dilute aqueous hydrochloric acid followed by water until neutral, then stripped in vacuo to yield a colorless viscous liquid weighing 71.8 g (100% yield), with Mw=3342, Mn=1801, and equivalent weight 1143.

B. Conversion to Diazido Polymer

The procedure of Example 1, Section B, was followed, using 17.3 g of the prepolymer of Section A above, 17.6 g of sodium azide and 140.6 g of dimethyl sulfoxide. Workup of the product resulted in a light brown viscous oil weighing 6.7 g (35.4% yield). Infrared spectroscopy (film) showed 3500 cm$^{-1}$ (—OH), 2100 cm$^{-1}$ (—N$_3$) and 1100 cm (C—O—C); gel permeation chromatography gave Mw=1993 and Mn=1080.

C. Hazard Characteristics

The results of hazard testing as described in Example 1, Section C, were as follows:

| Impact (Bureau of Mines, 2 kg weight) | 89 cm (noise) |
|---|---|
| Rotary friction | >4000 g at 2000 rpm |
| Spark | >0.025 joule |
| DTA exotherm - onset: | 151.1° C. |
| peaks: | 216.7° C., 225.6° C. |

EXAMPLE 4

This example illustrates the preparation and properties of a 50/50 copolymer of 1,4-diazido-2,3-epoxybutane and azidomethyl ethylene oxide.

A. Preparation of Epichlorohydrin/1,4-Dichloro-2,3-epoxybutane Copolymer.

A reaction flask was charged with the following:

| Ethylene glycol | 1.75 g |
|---|---|
| Anhydrous stannic chloride | 1.51 g |
| 1,2-Dichloroethane | 50 ml |

The mixture was placed under positive nitrogen pressure and stirred until fully dissolved. A solution of 46.3 g of epichlorohydrin and 70.5 g 1,4-dichloro-2,3-epoxybutane (prepared according to the procedure described in Example 1) in 100 ml of 1,2-dichloroethane was added to the mixture in dropwise manner at 21° C. over a period of two hours, causing an exothermic reaction which raised the temperature of the reaction mixture to 44.5° C., Four portions of anhydrous stannic chloride totalling 9.55 g were then added over 3.5 hours, with the reaction mixture temperature at 45°–65°

C. Eight additional portions of anhydrous stannic chloride totalling an additional 23.88 g were then added over nine hours at a temperature range of 45°–82° C. Stirring was then continued at 82° C. until no 1,4-dichloro-2,3-epoxybutane could be detected by gas chromatography.

The reaction mixture was then chilled and quenched by a mixture of 171 g of methanol, 142 g of water and 6 g of 29.6% ammonium hydroxide. The aqueous layer was then discarded and the organic layer was washed with six 400-ml portions of water, filtered through a sintered glass filter and dried by azeotropic distillation. Removal of most of the 1,2-dichloroethane resulted in a black viscous oil. The latter was then dissolved in 400 g of methylene chloride and purified by a silica gel column, then concentrated in vacuo to give a brown viscous oil weighing 103.4 g (87.2% yield). Infrared film spectroscopy gave 3500 cm$^{-1}$ (—OH), 1100 cm$^{-1}$ (C—O—C), 750 cm$^{-1}$ (C—Cl); and gel permeation chromatography gave Mn=809, with an equivalent weight of 940.

B. Conversion to Diazido polymer

The procedure of Example 1, Section C, was followed, using 58.4 g of the copolymer product of Section A above, 58.5 g of sodium azide and 188.8 g of dimethyl sulfoxide. Workup of the product resulted in a brown viscous oil weighing 39.6 g (62.6% yield). Infrared film spectroscopy gave 3500 cm$^{-1}$ (—OH), 2100 cm$^{-1}$ (—N$_3$), 1100 cm$^{-1}$ (C—O—C), confirming the structure as that of the diazido/azido copolymer; and gel permeation chromatography gave Mw=857 and Mn=608. The equivalent weight was determined to be 851.

C. Hazard Characteristics

The results of hazard testing as described in Example 1, Section C, were as follows:

| Impact (Bureau of Mines, 2 kg weight) | 68 cm (noise) |
| --- | --- |
| Rotary friction | >4000 g at 2000 rpm |
| Spark | >0.025 joule |
| DTA exotherm - onset: | 170.0° C. |
| peak: | 228.3° C. |

EXAMPLE 5

This example illustrates the preparation and properties of a 50/50 copolymer of 1,4-diazido-2,3-epoxybutane and 3,4-diazido-1,2-epoxybutane.

A. Preparation of poly(4-dichloro-2,3-epoxybutane/3,4-dichloro-1,2-epoxybutane)

A reaction flask under a positive nitrogen atmosphere was charged with 1.24 g of ethylene glycol and 60 ml of methylene chloride, followed by the addition of 0.41 g of boron trifluoride etherate. The mixture was heated to reflux and 49.4 g of 1,4-dichloro-2,3-epoxybutane and 49.8 g of 3,4-dichloro-1,2-epoxybutane in 60 ml of methylene chloride was added dropwise over forty-five minutes. An additional 6.52 g of boron trifluoride etherate was added in seven portions over seventeen hours at the reflux temperature which was then 43°–49° C. The reaction mixture was then quenched with 200 ml of a methanol/water/28% ammonium hydroxide (171/142/6) solution. The aqueous layer was then discarded and the organic layer was washed with deionized water and methanol/water (288.5/32), then dried over sodium sulfate and purified by a silica gel column. The solvent was then stripped from the product in vacuo to yield a brown viscous liquid weighing 73.1 g (73.7% yield), with Mw=623, Mn=509, and equivalent weight 1094.

Conversion to Diazido Polymer

The procedure of Example 1, Section B, was followed, using 29.6 g of the copolymer of Section A above, 30.0 g of sodium azide and 160.1 g of dimethyl sulfoxide. Workup of the product resulted in a brown viscous oil weighing 20.6 g (73.7% yield). Infrared spectroscopy showed 3500 cm$^{-1}$ (—OH), 2100 cm$^{-1}$ (—N$_3$) and 1100 cm$^{-1}$ (C—O—C); gel permeation chromatography gave Mw=645 and Mn=526.

C. Hazard Characteristics

The results of hazard testing as described in Example 1, Section C, were as follows:

| Impact (Bureau of Mines, 2 kg weight) | 38 cm (noise) |
| --- | --- |
| Rotary friction | >4000 g at 2000 rpm |
| Spark | >0.025 joule |
| DTA exotherm - onset: | 114.4° C. |
| peak: | 196.1° C. |

EXAMPLE 6

This example demonstrates the unusually low impact sensitivity of one of the diazido polymers of the present invention when compared to a similarly structured species of the prior art. The species of the present invention is poly(1,4-diazido-2,3-epoxybutane), hereinafter referred to as DAP, and the prior art species is poly(3,3-bisazidomethyloxetane), hereinafter referred to as BAMO (Earl et al., U.S. Pat. No. 4,405,762, Sep. 20, 1983). The latter has the structural formula

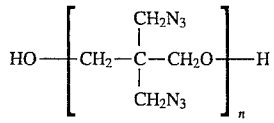

while the former has the structure of Formula I herein (under the section heading "Detailed Description of the Invention") with R$^1$=CH$_2$N$_3$, R$^2$=H, R$^3$=CH$_2$N$_3$ and R$^4$=H.

From their structural formulae, the heats of explosion of these two polymers on a weight basis readily calculates to −98.1 kcal per 100 g for DAP and −84 kcal per 100 g for BAMO. Surprisingly, however, the impact sensitivity tests (Bureau of Mines, 2 kg) yield the following results:

| Impact Sensitivity Comparisons | | |
| --- | --- | --- |
| | Impact Test Value (cm) | |
| Mw | DAP | BAMO |
| 170 | | 13 |
| 645 | 38 | |
| 875 | 44 | |
| 1000 | | 17 |
| 1800 | | 40 |
| 1993 | 89 | |
| 3000 | | 50 |

Recalling that a greater height (in cm) indicates a lower sensitivity to impact, it is noted that while DAP has a higher heat of explosion than BAMO, its sensitivity to impact is lower. The expectation would be that both vary in the same direction.

EXAMPLE 7

This example demonstrates the unusually high thermal stability of copolymers when compared to homopolymers of the same repeating units. The copolymer tested here is that prepared in Example 4 above, and the corresponding homopolymers are DAP (see Example 6) and glycidyl azide polymer (hereinafter GAP) having the formula

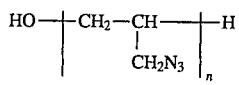

The copolymer is accordingly referred to as GAP/DAP.

The heats of explosion and thermal stabilities as indicated by the onset temperatures for the exotherms in both differential thermal analysis (DTA) and differential scanning calorimeter (DSC) determinations are as follows:

| Polymer | Heat of Explosion (kcal/100 g) | Onset Temperature (°C.) | |
|---|---|---|---|
| | | DTA | DSC |
| GAP | −63.3 | 165 | 200 |
| DAP | −98.1 | 139 | 178 |
| GAP/DAP | −80.7 | 170 | 219 |

Thermal Stability Comparisons

It is clear from these data that the copolymer is more stable than either of the two homopolymers.

EXAMPLE 8

This example illustrates the preparation and properties of the homopolymer poly(1,4-diazido-2,3-diazidomethyl-2,3-epoxybutane), conveniently referred to herein as "TAP" (for tetraazido polymer).

A. Preparation of 2,3-Bischloromethyl-1,4-dichloro-2,3-epoxybutane

A reaction flask was charged with 145 ml of methylene chloride, chilled in an ice bath, and placed under a positive nitrogen atmosphere. Trifluoroacetic anhydride 51.9 g (0.247 mole) was added in one portion when the pot temperature was 10° C. Hydrogen peroxide solution (50%) 6.9 g (0.101 mole) was then added in several portions. The exotherm raised the pot temperature to 32° C. The reaction mixture was then chilled to 80° C. A solution of 2,3-bischloromethyl-1,4-dichloro-2-butene 5.6 g (25.6 m moles) in methylene chloride 30 ml was added dropwise over a twenty-minute period. The resulting reaction mixture was warmed to ambient temperature for three hours and refluxed for five hours.

During workup, the methylene chloride solution was washed consecutively by deionized water 1 ×200 ml, 5% sodium bicarbonate solution 2×200 ml, and deionized water 2×200 ml. The methylene chloride solution was stripped in vacuo to give 5.81 g yellowish oil (95.4% yield): FTIR (film): 2974 cm$^{-1}$ (C—CH), 1100 cm$^{-1}$ (oxirane ring); proton nmr (CDCl$_3$): δ3.7, d, —CH$_2$C, 3.9, d, —CH$_2$C.

B. Conversion to Poly (2,3-bischloromethyl-1,4-dichloro-2,3-epoxybutane)

A reaction flask was charged with 2,3-bischloromethyl-1,4-dichloro-2,3-epoxybutane 5.62 g (23.6 m moles) and methylene chloride 100 ml, and placed under a positive nitrogen atmosphere. A first portion of magic acid (SbF$_5$/FSO$_3$H=1/1) 1.76 g was then added at ambient temperature (24.5° C.). The reaction mixture was then a warmed to reflux and maintained at reflux for nineteen hours. A second portion of magic acid 0.52 g was then added and the reaction mixture was maintained at reflux for an additional five hours.

After cooling down the dark brown reaction mixture was quenched in sequence by ethylene glycol 3.0 g and deionized water 175 ml. Two phases were separated out. The aqueous layer was discarded. The methylene chloride layer was washed by deionized water 4×200 ml, 5% sodium bicarbonate solution 2×200 ml, and deionized water 2×200 ml. After washing, the methylene chloride solution was subjected to vacuum stripping to give 3.57 g brownish oil (63.5% yield); GPC (propylene glycol as a standard): composed predominantly of oligomers and approximately 10% high molecular weight polymers (MW 1000 to 4000) FTIR (film): 3538 cm$^{-1}$ (—OH), 3000 cm$^{-1}$ (C—CH), and 1047 cm$^{-1}$ (C—O—C).

C. Conversion to Tetraazido polymer

A reaction flask was charged with dimethyl sulfoxide 100 ml and heated to 88° C. under a positive nitrogen atmosphere. Sodium azide 3.65 g (56.1 m moles) was added in one portion. A solution of poly(2,3-bischloromethyl-1,4-dichloro-2,3-epoxybutane) 3.0 g (12.6 m moles monomer basis) in dimethyl sulfoxide 18 ml was then added dropwise over a period of sixty-seven minutes in the temperature range of 82° to 89° C. The post-addition stir time was twenty-five hours at 85°–86° C.

After cooling down, the reaction was quenched by deionized water 400 ml and extracted by methylene chloride 4×30 ml. The combined methylene chloride solution was washed by deionized water 10×150 ml. After drying over anhydrous sodium sulfate, the methylene chloride solution of product weighed 122.62 g. Based on a solution evaporation/filter paper method, this methylene solution contained approximately 1.31 g TAP (39.3% yield); FTIR (KBr/Diffuse Reflectance): 3500 cm$^{-1}$ (—OH), 2100 cm$^{-1}$ (—N$_3$), 1290 cm$^{-1}$ (C—O—C); DTA exotherm onset 154.4° C., exotherm peak 192° C.

What is claimed is:

1. A hydroxy-terminated aliphatic polyether having the formula

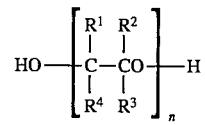

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4, and n is an integer ranging from 2 to 40.

2. A hydroxy-terminated aliphatic polyether according to claim 1 in which $R^1$, $R^2$, $R^3$ and $R^4$ are independently selected from the group consisting of H and $CH_2N_3$.

3. A hydroxy-terminated aliphatic polyether according to claim 1 in which n is an integer ranging from 3 to 30.

4. A hydroxy-terminated aliphatic polyether according to claim 1 in which $R^1$, $R^2$, $R^3$ and $R^4$ are independently selected from the group consisting of H and $CH_2N_3$ such that the total number of $N_3$ groups per monomer unit is two and n is an integer ranging from 3 to 30.

5. A hydroxy-terminated aliphatic polyether according to claim 1 in which $R^1$, $R^2$, $R^3$ and $R^4$ are each $CH_2N_3$ and n is an integer ranging from 3 to 30.

6. A hydroxy-terminated aliphatic polyether having the formula

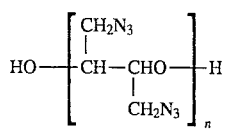

in which n is an integer ranging from 2 to 40.

7. A hydroxy-terminated aliphatic polyether according to claim 6 prepared from a starting material comprising a mixture of cis- and trans-isomers of a 1,4-dihalo-2-butene.

8. A hydroxy-terminated aliphatic polyether having the formula

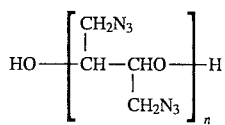

in which n is an integer ranging from 3 to 30.

9. A hydroxy-terminated aliphatic polyether according to claim 8 prepared from a starting material comprising a mixture of cis- and trans-isomers of a 1,4-dihalo-2-butene.

10. A hydroxy-terminated aliphatic polyether having the formula

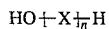

in which n is an integer ranging from about 2 to about 40 and X is at least one member selected from the group consisting of monomer units having the formula

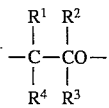

in which $R^1$, $R^2$, $R^3$ and $R^4$ are independently selected from the group consisting of H, $CH_2N_3$ and $CHN_3CH_2N_3$ such that the total number of $N_3$ groups per monomer unit is 2 to 4.

11. A hydroxy-terminated aliphatic polyether according to claim 10 in which, in at least one monomer unit in said polyether, $R^1$, $R^2$, $R^3$ and $R^4$ are independently selected from the group consisting of H and $CH_2N_3$, and the total number of $N_3$ groups in said monomer unit is two.

12. A hydroxy-terminated aliphatic polyether according to claim 9 in which $[X]_n$ represents a combination of at least two monomer units within said formula, in one of which $R^1$ is $CH_2N_3$, $R^2$ is H, $R^3$ is $CH_2N_3$, and $R^4$ is H, and in the other of which $R^1$ is H, $R^2$ is H, $R^3$ is $CHN_3CH_2N_3$, and $R^4$ is H.

13. A hydroxy-terminated aliphatic polyether according to claim 9 in which $[X]_n$ represents a combination of two monomer units within said formula, the first comprising about 40% to about 60% of said polyether and the second comprising the remainder; and in said first, $R^1$ is $CH_2N_3$, $R^2$ is H, $R^3$ is $CH_2N_3$, and $R^4$ is H; and in said second, $R^1$ is H, $R^2$ is H, $R^3$ is $CHN_3CH_2N_3$, and $R^4$ is H.

14. A hydroxy-terminated aliphatic polyether according to claim 9 in which $[X]_n$ represents a combination of two monomer units within said formula, each comprising about half of the total number of monomer units therein, in the first of which $R^1$ is $CH_2N_3$, $R^2$ is H, and $R^3$ is $CH_2N_3$, and $R^4$ is H; and in the second of which $R^1$ is H, $R^2$ is H, $R^3$ is $CHN_3CH_2N_3$ and $R^4$ is H.

15. A hydroxy-terminated aliphatic polyether according to claim 10 in which in about half of said monomer units $R^1$ is $CH_2N_3$, $R^2$ is H, $R^3$ is $CH_2N_3$, and $R^4$ is H and in the remainder of said monomer units R is H, $R^2$ is H, $R^3$ is $CHN_3CH_2N_3$, and $R^4$ is H.

16. A hydroxy-terminated aliphatic polyether according to claim 10 in which, in at least one monomer unit in said polyether, $R^1$, $R^2$, $R^3$ and $R^4$ are each $CH_2N_3$.

17. A hydroxy-terminated aliphatic polyether according to claim 10 in which n is an integer ranging from 3 to 30.

18. A hydroxy-terminated aliphatic polyether according to claim 12 in which n is an integer ranging from 3 to 30.

19. A hydroxy-terminated aliphatic polyether according to claim 15 in which n is an integer ranging from 3 to 30.

20. A hydroxy-terminated aliphatic polyether according to claim 16 in which n is an integer ranging form 3 to 30.

21. A hydroxy-terminated aliphatic polyether having the formula

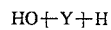

in which Y is a chain of from 2 to 40 monomer units comprising a combination of at least two members selected from the group consisting of (a)

in which $R^1$, $R^2$, $R^3$ and $R^4$ are independently selected from the group consisting of H, $N_3$, $CH_2N_3$ and $CHN_3CH_2N_3$, such that the total number of $N_3$ groups per monomer unit is 2 to 4;

(b)

in which $R^5$ is selected from the group consisting of $CH_2CHN_3CH_2N_3$ and $(CH_2)_rN_3$ where r is an integer from 1 to 5; and (c)

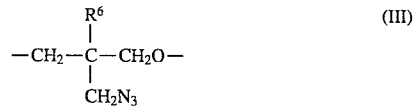

in which $R^6$ is selected from the group consisting of H, $CH_3$ and $CH_2N_3$.

22. A hydroxy-terminated aliphatic polyether having the formula

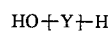

in which Y is a chain comprised of n monomer units having the formula

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4;

p monomer units having the formula

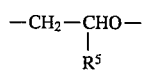

in which $R^5$ is selected from the group consisting of $CH_2CHN_3CH_2N_3$ and $(CH_2)_rN_3$ where r is an integer from 1 to 5; and q monomer units having the formula

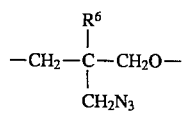

in which $R^6$ is selected from the group consisting of H, $CH_3$ and $CH_2N_3$; and n, p and q are integers such that n is at least 1, the sum of p and q is at least 1, and the sum of n, p and q is at most 40.

23. A hydroxy-terminated aliphatic polyether according to claim 22 in which said polyether terminates at each end in a —$CH_2OH$ group.

24. A hydroxy-terminated aliphatic polyether according to claim 22 in which $R^5$ in Formula II is selected from the group consisting of $CH_2N_3$ and $CH_2CHN_3CH_2N_3$.

25. A hydroxy-terminated aliphatic polyether according to claim 22 in which $R^6$ in Formula III is $CH_2N_3$.

26. A hydroxy-terminated aliphatic polyether according to claim 22 in which q is zero and the ratio of n to p is from about 0.6 to about 1.5.

27. A hydroxy-terminated aliphatic polyether according to claim 22 in which q is zero and the ratio of n to p is from about 0.8 to about 1.2.

28. A hydroxy-terminated aliphatic polyether according to claim 22 in which q is zero and the ratio of n to p is about 1.0.

29. A hydroxy-terminated aliphatic polyether according to claim 22 in which q is zero and $R^5$ in Formula II is $CH_2N_3$.

30. A hydroxy-terminated aliphatic polyether according to claim 22 in which p is zero and $R^6$ in Formula III is $CH_2N_3$.

31. In an explosive composition formed from an explosive and an energetic binder, the improvement in which said binder is a hydroxy-terminated aliphatic polyether having the formula

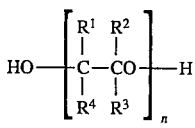

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4, and n is an integer ranging from 2 to 40.

32. An explosive composition in accordance with claim 31 in which said binder is a hydroxy-terminated aliphatic polyether having the formula

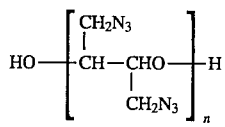

in which n is an integer ranging from 2 to 40.

33. In an explosive composition comprising an explosive and an energetic binder, the improvement in which said binder is a hydroxy-terminated aliphatic polyether having the formula $$HO+Y+H$$

in which Y is a chain of from 2 to 40 monomer units comprising a combination of at least two members selected from the group consisting of (a) 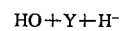

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4;

(b) 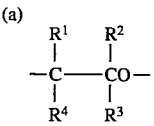

in which $R^5$ is selected from the group consisting of $CH_2CHN_3CH_2N_3$ and $(CH_2)_rN_3$ where r is an integer from 1 to 5; and (c) 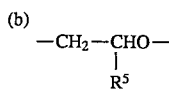

in which $R^6$ is selected from the group consisting of H, $CH_3$ and $CH_2N_3$.

34. An explosive composition in accordance with claim 33 in which said chain is comprised of n units of Formula I, p units of Formula II and q units of Formula III, such that n is at least 1, the sum of p and q is at least 1, and the sum of n, p and q is at most 40.

35. In an explosive composition comprising an explosive and an energetic binder, the improvement in which said binder is a hydroxy-terminated aliphatic polyether having the formula

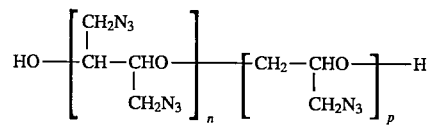

which n and p are integers such that the sum of n and p is from 2 to 40.

36. In a propellant composition comprising an oxidizer and an energetic binder, the improvement in which said binder is a hydroxy-terminated aliphatic polyether having the formula

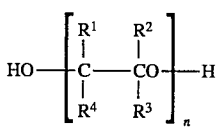

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4, and n is an integer ranging from 2 to 40.

37. A propellant composition in accordance with claim 36 in which said binder is a hydroxy-terminated aliphatic polyether having the formula

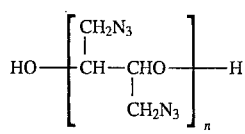

in which n is an integer ranging from 2 to 40.

38. In a propellant composition comprising an oxidizer and an energetic binder, the improvement in which said binder is a hydroxy-terminated aliphatic polyether having the formula

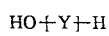

in which Y is a chain of from 2 to 40 monomer units comprising a combination of at least two members selected from the group consisting of (a) 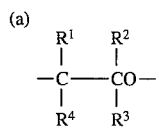 (I)

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4;

(b) 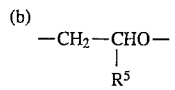 (II)

in which $R^5$ is selected from the group consisting of $CH_2CHN_3CH_2N_3$ and $(CH_2)_rN_3$ where r is an integer from 1 to 5; and (c) 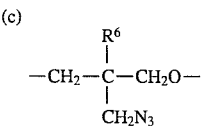 (III)

in which $R^6$ is selected from the group consisting of H, $CH_3$ end $CH_2N_3$.

39. A propellant composition in accordance with claim 38 in which said chain is comprised of n units of Formula I, p units of Formula II and q units of Formula III, such that n is at least 1, the sum of p and q is at least 1, and the sum of n, p and q is at most 40.

40. In a propellant composition comprising an oxidizer and an energetic binder, the improvement in which said binder is a hydroxy-terminated aliphatic polyether having the formula

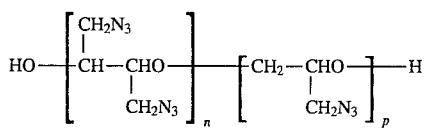

in which n and p are integers such that the sum of n end p is from 2 to 40.

41. A method of preparing an energetic binder having a preselected level of energy output per unit weight, comprising forming a copolymer containing a combination of monomer units selected from the group consisting of (a) 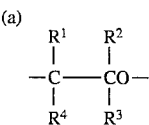 (I)

in which $R^1$, $R^2$, $R^3$ and $R^4$ are independently selected from the group consisting of H, $CH_2N_3$ and $CHN_3CH_2N_3$, such that the total number of $N_3$ groups per monomer unit is 2 to 4;

(b) 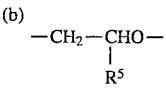 (II)

in which $R^5$ is selected from the group consisting of $CH_2CHN_3CH_2N_3$ and $(CH_2)_rN_3$ where r is an integer from 1 to 5; and (c) 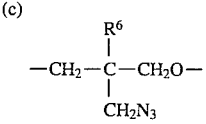 (III)

in which $R^6$ is selected from the group consisting of H, $CH_3$ and $CH_2N_3$, such that the average energy output per monomer unit in said copolymer is at said preselected level.

* * * * *